(12) United States Patent
Gao et al.

(10) Patent No.: US 10,795,191 B2
(45) Date of Patent: Oct. 6, 2020

(54) DISPLAY DEVICE INCLUDING OPTICAL ELEMENT HAVING ADJUSTABLE REFRACTIVE INDEX AND DISPLAY METHOD

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Xiandong Meng, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 169 days.

(21) Appl. No.: 16/078,285

(22) PCT Filed: Nov. 1, 2017

(86) PCT No.: PCT/CN2017/108866
§ 371 (c)(1),
(2) Date: Aug. 21, 2018

(87) PCT Pub. No.: WO2018/196314
PCT Pub. Date: Nov. 1, 2018

(65) Prior Publication Data
US 2020/0183209 A1    Jun. 11, 2020

(30) Foreign Application Priority Data
Apr. 25, 2017   (CN) .......................... 2017 1 0277645

(51) Int. Cl.
*G02F 1/133* (2006.01)
*G03H 1/22* (2006.01)
(Continued)

(52) U.S. Cl.
CPC .... *G02F 1/13306* (2013.01); *G02F 1/133528* (2013.01); *G02F 1/134309* (2013.01);
(Continued)

(58) Field of Classification Search
CPC ........... G02F 1/13306; G02F 1/133528; G02F 1/134309; G02F 1/13342; G02F 2001/133531; G03H 1/22
See application file for complete search history.

(56) References Cited

U.S. PATENT DOCUMENTS 8,040,316 B2    10/2011  Iwane
10,146,181 B2 *  12/2018  Kim ..................... G03H 1/2294
(Continued)

FOREIGN PATENT DOCUMENTS

CN        1383025 A     12/2002
CN      102540489 A      7/2012
(Continued)

OTHER PUBLICATIONS

International Search Report and Written Opinion, including English translation of Box V of the Written Opinion, for International Application No. PCT/CN2017/108866, dated Feb. 5, 2018, 17 pages.

(Continued)

*Primary Examiner* — Stephen G Sherman
(74) *Attorney, Agent, or Firm* — Westman, Champlin & Koehler, P.A.

(57) ABSTRACT

A display device and a display method are provided. The display device includes: an optical element including a plurality of optical units arranged independent of each other, wherein one or more optical parameters of each of the optical units are adjustable, and the one or more optical parameters comprise at least one of light transmittance or refractive index; a laser source arranged at a side of the (Continued)

optical element, and configured to emit a laser beam related to a to-be-displayed holographic image; and a driving circuit configured to adjust the light transmittance and/or refractive index of each of the optical units in accordance with image data about the to-be-displayed holographic image in such a manner that the optical unit is configured to modulate the laser beam or a linearly-polarized light beam acquired by converting the laser beam.

14 Claims, 6 Drawing Sheets

(51) Int. Cl.
  *G02F 1/1335*    (2006.01)
  *G02F 1/1343*    (2006.01)
  *G02F 1/1334*    (2006.01)

(52) U.S. Cl.
  CPC ........... *G03H 1/22* (2013.01); *G02F 1/13342* (2013.01); *G02F 2001/133531* (2013.01)

(56) References Cited

U.S. PATENT DOCUMENTS

| | | | | |
|---|---|---|---|---|
| 2002/0008821 A1* | 1/2002 | Lee | .................... | G02F 1/13306 349/139 |
| 2002/0027680 A1* | 3/2002 | Kihara | ..................... | G03H 1/22 359/23 |
| 2003/0007129 A1* | 1/2003 | Ashizaki | ................. | G03H 1/22 353/7 |
| 2006/0114383 A1* | 6/2006 | Kobayashi | ........... | G02B 5/3016 349/117 |
| 2008/0007952 A1 | 1/2008 | Iwane | | |
| 2009/0207466 A1* | 8/2009 | Bucklay | ................... | G02B 3/14 359/9 |
| 2014/0022616 A1* | 1/2014 | Popovich | ............. | G02B 5/0252 359/15 |
| 2014/0111609 A1* | 4/2014 | Yamaichi | ............. | G03H 1/0272 348/40 |
| 2014/0293386 A1* | 10/2014 | Choi | .................... | G03H 1/2294 359/9 |

FOREIGN PATENT DOCUMENTS

| | | |
|---|---|---|
| CN | 103278994 A | 9/2013 |
| CN | 103513431 A | 1/2014 |
| CN | 105807349 A | 7/2016 |
| CN | 106154800 A | 11/2016 |
| CN | 106227017 A | 12/2016 |
| CN | 106338905 A | 1/2017 |
| CN | 205992124 U | 3/2017 |
| CN | 206057815 U | 3/2017 |
| CN | 106940486 A | 7/2017 |
| JP | H06-167919 A | 6/1994 |
| JP | 2002-268051 A | 9/2002 |
| JP | 2008-15125 A | 1/2008 |

OTHER PUBLICATIONS

First Office Action, including Search Report, for Chinese Patent Application No. 201710277645.3, dated Apr. 15, 2019, 25 pages.

* cited by examiner

DISPLAY DEVICE INCLUDING OPTICAL ELEMENT HAVING ADJUSTABLE REFRACTIVE INDEX AND DISPLAY METHOD

CROSS-REFERENCE TO RELATED APPLICATION

The present application is the U.S. national phase of PCT Application No. PCT/CN2017/108866 filed on Nov. 1, 2017, which claims a priority of the Chinese patent application No. 201710277645.3 filed on Apr. 25, 2017, which is incorporated herein by reference in its entirety.

TECHNICAL FIELD

The present disclosure relates to the field of display technology, in particular to a display device and a display method.

BACKGROUND

For a conventional holographic plate, information about amplitude and phase of an object light beam is recorded in the form of contrast and brightness change of interference fingers, so as to form irregular interference fingers. The exposed holographic plate is subjected to such treatments as development and fixation so as to acquire a holographic image, which is equivalent to an amplitude-pattern diffraction grating. In the case that the holographic plate is irradiated with a reference light beam, a reproduced image having a shape identical to an original object may be viewed by human eyes by viewing the holographic plate through light projection.

However, in the related art, a static image is recorded by the holographic plate, and it is impossible to view a dynamic, holographic image through the holographic plate.

SUMMARY

An object of the present disclosure is to provide a display device and a display method, so as to dynamically display a holographic image.

In one aspect, the present disclosure provides in some embodiments a display device, including: an optical element including a plurality of optical units arranged independent of each other, wherein one or more optical parameters of each of the optical units are adjustable, and the one or more optical parameters comprise at least one of light transmittance or refractive index; a laser source arranged at a side of the optical element, and configured to emit a laser beam related to a to-be-displayed holographic image; and a driving circuit configured to adjust the light transmittance and/or refractive index of each of the optical units in accordance with image data about the to-be-displayed holographic image in such a manner that the optical unit is configured to modulate the laser beam or a linearly-polarized light beam acquired by converting the laser beam.

In a possible embodiment of the present disclosure, each of the optical units is a liquid crystal unit including liquid crystal molecules configured of being deflected under the effect of an electric field.

In a possible embodiment of the present disclosure, the optical element includes: a first substantially transparent substrate and a second substantially transparent substrate arranged opposite to each other; a liquid crystal cell arranged between the first substantially transparent substrate and the second substantially transparent substrate and including a plurality of liquid crystal units arranged independent of each other; and a first electrode and a second electrode, the electric field configured of being generated between the first electrode and the second electrode to drive the liquid crystal molecules in the liquid crystal unit to be deflected.

In a possible embodiment of the present disclosure, both the first electrode and the second electrode are arranged on either one of the first substantially transparent substrate and the second substantially transparent substrate.

In a possible embodiment of the present disclosure, the first electrode is arranged at a side of the first substantially transparent substrate that is closer to the liquid crystal cell than another side of the first substantially transparent substrate being opposite to the side of the first substantially transparent substrate, and the second electrode is arranged at a side of the second substantially transparent substrate that is closer to the liquid crystal cell than another side of the second substantially transparent substrate being opposite to the side of the second substantially transparent substrate.

In a possible embodiment of the present disclosure, the optical units are configured to enable the to-be-displayed holographic image to include a plurality of fringes having different brightness values, and each of the fringes corresponds to respective at least one optical unit. The driving circuit is further configured to adjust the light transmittance of the respective optical unit corresponding to each of the fringes in accordance with the brightness value of the fringe.

In a possible embodiment of the present disclosure, the larger the brightness value of the fringe, the larger the light transmittance of the respective optical unit corresponding to the fringe.

In a possible embodiment of the present disclosure, the display device further includes: a first polarizer arranged at the side of the optical element, an initial alignment direction of the liquid crystal molecules in the liquid crystal unit being substantially parallel to a transmission axis of the first polarizer; and a second polarizer arranged at a light-exiting side of the optical element, a transmission axis of the second polarizer being perpendicular to the transmission axis of the first polarizer.

In a possible embodiment of the present disclosure, the first polarizer is arranged at a side of the first substantially transparent substrate that is further away from the liquid crystal cell than another side of the first substantially transparent substrate being opposite to the side of the first substantially transparent substrate, and the second polarizer is arranged at a side of the second substantially transparent substrate that is further away from the liquid crystal cell than another side of the second substantially transparent substrate being opposite to the side of the second substantially transparent substrate.

In a possible embodiment of the present disclosure, the optical units are configured to enable the to-be-displayed holographic image to include a plurality of fringes having different brightness values, and each of the fringes corresponds to respective at least one optical unit. The driving circuit is further configured to adjust the refractive index of the respective optical unit corresponding to each of the fringes in accordance with the brightness value of the fringe.

In a possible embodiment of the present disclosure, the driving circuit includes: a calculation unit configured to determine a holographic plate corresponding to the to-be-displayed holographic image in accordance with the image data, and adjust a refractive index of a first optical unit of the plurality of optical units in such a manner that an optical path difference of the linearly-polarized light beam in the liquid crystal cell is equivalent to an optical path difference of the linearly-polarized light beam in the holographic plate. The holographic plate includes M regions arranged between each of two sides of a center line of the holographic plate and a respective edge of the holographic plate in a widthwise direction, the respective edge of the holographic plate is opposite to the center line of the holographic plate, a $(2k)^{th}$ region is a grating groove corresponding to the first optical unit and having a depth of h, $nh-h=n_e d-n_o d$, N steps are arranged in each grating groove, N=2m, a phase difference between two adjacent ones of the steps is $2n/N$, each of the steps has a height of $\lambda/N*(n-1)$, where $\lambda$ represents a wavelength of a visible light beam, n represents a refractive index of the holographic plate, d represents a thickness of the liquid crystal cell, M is an integer greater than 1, m is an integer greater than or equal to 0, and k is an integer greater than 0 and small than or equal to M.

In a possible embodiment of the present disclosure, the display device further includes a third polarizer arranged at the side of the optical element, wherein the initial alignment direction of the liquid crystal molecules in the liquid crystal unit is substantially parallel to a transmission axis of the third polarizer.

In a possible embodiment of the present disclosure, the third polarizer is arranged at a side of the first substantially transparent substrate that is further away from the liquid crystal cell than another side of the first substantially transparent substrate being opposite to the side of the first substantially transparent substrate.

In a possible embodiment of the present disclosure, the laser beam is a linearly-polarized light beam whose polarized direction is substantially parallel to an initial alignment direction of the liquid crystal molecules.

In a possible embodiment of the present disclosure, the display device further includes a laser collimation and beam-expanding mechanism arranged between the laser source and the optical element and configured to expand a diameter of a collimated light beam from the laser source.

In a possible embodiment of the present disclosure, the laser source is further configured to generate a reference light beam corresponding to the to-be-displayed holographic image, or a light beam in conjugation with the reference light beam corresponding to the to-be-displayed holographic image.

In a possible embodiment of the present disclosure, the display device further includes a storage unit connected to the driving circuit and configured to store therein the image data.

In another aspect, the present disclosure provides in some embodiments display method for use in the above display device. The display method includes: emitting, by the laser source, a laser beam related to a to-be-displayed holographic image; and adjusting, by the driving circuit, the light transmittance and/or the refractive index of each of the optical units in accordance with image data about the to-be-displayed holographic image in such a manner that the optical unit is configured to modulate the laser beam or a linearly-polarized light beam acquired by converting the laser beam.

In a possible embodiment of the present disclosure, the to-be-displayed holographic image is enabled by the optical units to include a plurality of fringes having different brightness values, and each of the fringes corresponds to respective at least one optical unit. The step of adjusting by the driving circuit the light transmittance and/or the refractive index of each of the optical units in accordance with the image data about the to-be-displayed holographic image includes: adjusting, by the driving circuit, the light transmittance and/or refractive index of the respective optical unit corresponding to each of the fringes in accordance with the brightness value of the fringe.

According to the embodiments of the present disclosure, in the case of displaying the holographic image, the laser source emits the laser beam corresponding to the to-be-displayed holographic image, and each optical unit is capable of modulating the incident linearly-polarized light beam and has the adjustable light transmittance and/or refractive index. Through controlling the light transmittance and/or the refractive index of the optical unit, it is able for the optical path difference of the light beam of the laser in the optical element to be equivalent to the optical path difference of the light beam of the laser in a normal holographic plate, thereby to display the holographic image. In addition, the refractive index and/or the light transmittance of the optical unit is capable of being adjusted dynamically, so it is able to display the holographic image dynamically in the case that the optical element is irradiated with the reference light beam.

DETAILED DESCRIPTION OF THE EMBODIMENTS

In order to make the objects, the technical solutions and the advantages of the present disclosure more apparent, the present disclosure will be described hereinafter in a detailed manner in conjunction with the drawings and embodiments.

Figure 1:
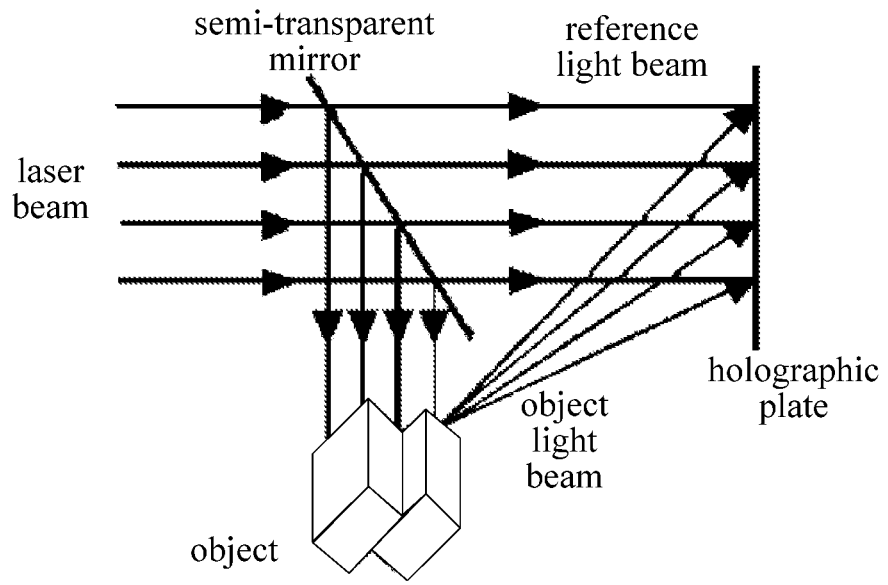
FIG. 1 is a schematic view showing a conventional holographic plate.
Figure 2:
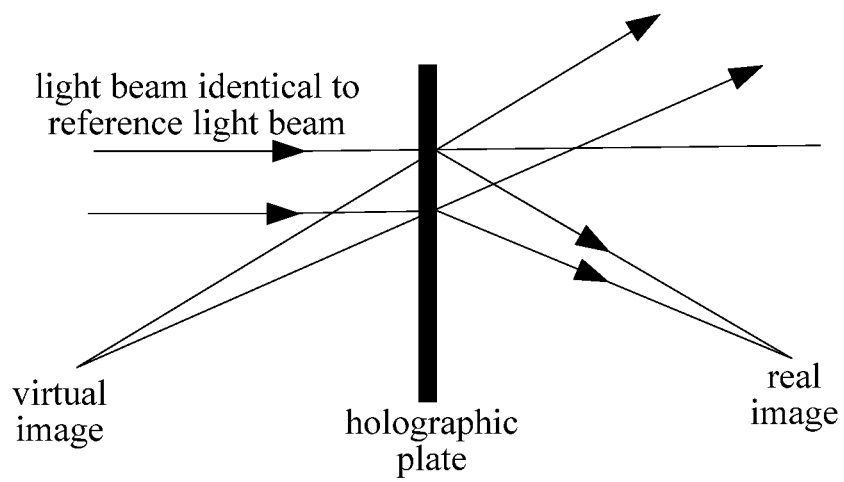
FIG. 2 is a schematic view showing an imaging procedure of the conventional holographic plate.

As shown in FIG. 1, for a conventional holographic plate, information about amplitude and phase of an object light beam is recorded in the form of contrast and brightness change of interference fingers. Such treatments as development and fixation are implemented to acquire irregular interference fringes, i.e., a holographic image, which is equivalent to an amplitude-pattern diffraction grating. FIG. 2 shows an imaging mode of the holographic image. In the case that the holographic plate is irradiated with a reference light beam or a light beam identical to the reference light beam, a reproduced image having a shape identical to an original object may be viewed by human eyes by viewing the holographic plate through light projection at a position where the original object is located behind the holographic plate.

However, a static image is recorded by such holographic plate in the related art, and it is impossible to view a dynamic, holographic image through the holographic plate.

An object of the present disclosure is to provide a display device and a display method, so as to dynamically display the holographic image.

The present disclosure provides in some embodiments a display device, which includes: an optical element including a plurality of optical units arranged independent of each other, each optical unit being capable of modulating an incident linearly-polarized light beam and having adjustable optical parameters (e.g., light transmittance and/or refractive index); a laser source arranged at a light-entering side of the optical element and configured to emit a laser beam corresponding to a to-be-displayed holographic image; and a driving circuit connected to the optical element; and a holographic image data storage unit connected to the driving circuit. The driving circuit is configured to acquire image data about the to-be-displayed holographic image stored in the holographic image data storage unit, and adjust the light transmittance and/or refractive index of each optical unit in accordance with the image data.

According to the embodiments of the present disclosure, in the case of displaying the holographic image, the laser source emits the laser beam corresponding to the to-be-displayed holographic image, and the optical unit is capable of modulating the incident linearly-polarized light beam and has the adjustable light transmittance and/or refractive index. Through controlling the light transmittance and/or the refractive index of the optical unit, it is able for the optical path difference of the light beam of the laser in the optical element to be equivalent to the optical path difference of the light beam of the laser in the normal holographic plate, thereby to display the holographic image. In addition, the refractive index and/or the light transmittance of the optical unit is capable of being adjusted dynamically, so it is able to display the holographic image dynamically in the case that the optical element is irradiated with a reference light beam.

To be specific, the optical element may be implemented by a liquid crystal panel. At this time, the optical element includes: a first substantially transparent substrate and a second substantially transparent substrate arranged opposite to each other; a liquid crystal cell arranged between the first substantially transparent substrate and the second substantially transparent substrate and including a plurality of liquid crystal units arranged independent of each other; and a first electrode and a second electrode arranged on the different transparent substrates respectively or arranged on an identical transparent substrate. An electric field is generated between the first electrode and the second electrode so as to drive liquid crystal molecules in each liquid crystal unit to be deflected. Each liquid crystal unit and the first electrode and the second electrode corresponding to the liquid crystal unit together form the optical unit.

Figure 3:
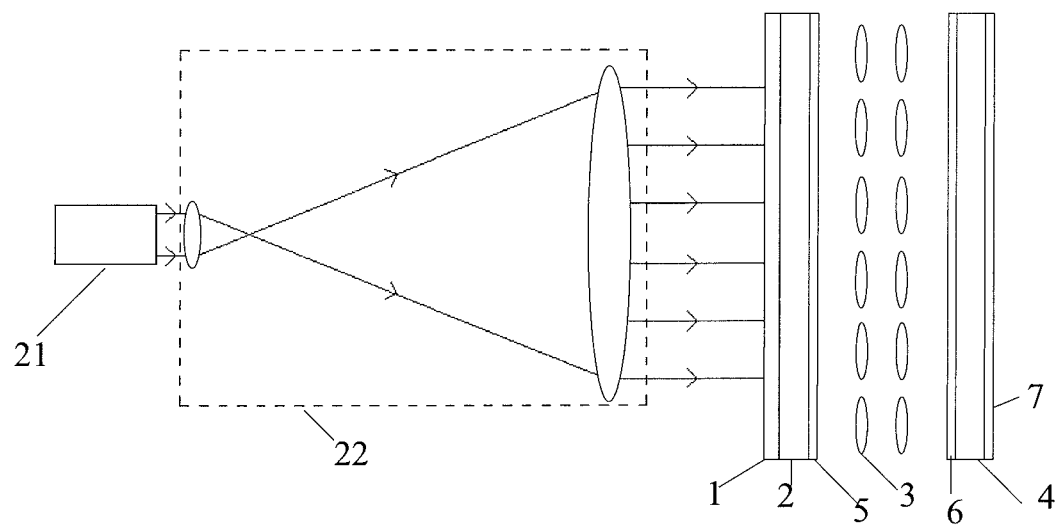
FIG. 3 is a schematic view showing a display device according to some embodiments of the present disclosure.

In the embodiments of the present disclosure, the light transmittance of the optical unit may be adjusted, so that the optical element is equivalent to a holographic plate. As shown in FIG. 3, the display device includes the laser source 21, a laser collimation and beam-expanding mechanism 22 and the optical element. The laser collimation and beam-expanding mechanism 22 is arranged between the laser source 21 and the optical element, and it is capable of expanding a diameter of a collimated light beam from the laser source 21. The laser source 21 is further configured to emit a reference light beam corresponding to the to-be-displayed holographic image, or a light beam in conjugation with the reference light beam corresponding to the to-be-displayed holographic image. In the case that the reference light beam corresponding to the to-be-displayed holographic image is emitted by the laser source 21, it is able for the human eyes to view a reproduced virtual image of the holographic image at the light-entering side of the optical element. In the case that the light beam in conjugation with the reference light beam corresponding to the to-be-displayed holographic image is emitted by the laser source 21, it is able for the human eyes to view a reproduced real image of the holographic image on a display at the light-exiting side of the optical element.

As shown in FIG. 3, the optical element includes: the first substantially transparent substrate 2 and the second substantially transparent substrate 4 arranged opposite to each other; the liquid crystal cell 3 arranged between the first substantially transparent substrate 2 and the second substantially transparent substrate 4 and including the plurality of liquid crystal units arranged independent of each other; and the first electrode 5 and the second electrode 6 arranged on different transparent substrates respectively or on an identical transparent substrate. The electric field is capable of being generated between the first electrode 5 and the second electrode 6 so as to drive the liquid crystal molecules in each liquid crystal unit to be deflected. To be specific, as shown in FIG. 3, the first electrode 5 may be arranged on the first substantially transparent substrate 2, and the second electrode 6 may be arranged on the second substantially transparent substrate 4. Each liquid crystal unit and the first electrode and the second electrode corresponding to the liquid crystal unit together form one optical unit.

Further, the optical units are configured to enable the to-be-displayed holographic image to include a plurality of fringes having different brightness values, and the optical element includes the optical units corresponding to the fringes respectively. In a possible embodiment of the present disclosure, each fringe may correspond to one respective optical unit, or a plurality of respective optical units. In some embodiments of the present disclosure, the number of the optical units may further depend on width distribution of each fringe. For example, in the case that each holographic fringe corresponding to an object point is wide in the middle and narrow at an edge (i.e., the fringes are distributed densely at a center region and sparsely at a peripheral region), the optical units may be distributed densely at the center region and the sparsely at the peripheral region. The driving circuit is further configured to adjust the light transmittance of the optical unit corresponding to each fringe in accordance with the brightness value of the fringe. At this time, the optical element is equivalent to an amplitude-mode diffractive grating including a plurality of optical units with different light transmittances.

To be specific, for each object point, its holographic image includes first fringes and second fringes arranged alternately. A brightness of the first fringe is different from a brightness of the second fringe, and each first fringe has a brightness value greater than a brightness value of the second fringe. After the holographic images of a plurality of object points have been superimposed one on another, it is able to acquire the plurality of fringes having different brightness values. The optical unit corresponding to a position where the first fringes are superimposed has the largest light transmittance which may be set as 1. The optical unit corresponding to a position where the second fringes are superimposed has the smallest light transmittance which may be set as 0. Each optical unit corresponding to a position where the first fringe and the second fringe are superimposed one on another has an intermediate light transmittance within the range of 0 to 1. The number of the superimposed fringes may be normalized so as to acquire the light transmittance of the optical unit at the position where the first fringe and the second fringe are superimposed one on another.

In the case of adjusting the light transmittance of the optical unit so as to enable the optical element to be equivalent to the holographic plate, polarizers may also be attached at the light-entering side and the light-exiting side of the optical element. As shown in FIG. 3, the display device may further include: a first polarizer 1 attached to the light-entering side of the optical element, an initial alignment direction of the liquid crystal molecules in each liquid crystal unit being substantially parallel to a transmission axis of the first polarizer; and a second polarizer 7 attached to the light-exiting side of the optical element, a transmission axis of the second polarizer being perpendicular to the transmission axis of the first polarizer.

In the display device as shown in FIG. 3, the liquid crystal cell is used to implement the light transmittance distribution which is identical to the brightness distribution of the interference fringes of the to-be-displayed holographic image. The light transmittance is the largest at a position where a bright fringe is located, and the light transmittance is 0 at a position where a dark fringe is located. In addition, the liquid crystal cell may control the light transmittance in a mode such as a Twisted-Nematic (TN) mode, an In-Plane Switching (IPS) mode, or a Fringe-Field Switching (FFS) mode.

The brightness distribution of the interference fringes of the to-be-displayed holographic image may be calculated as follows.

Figure 4:
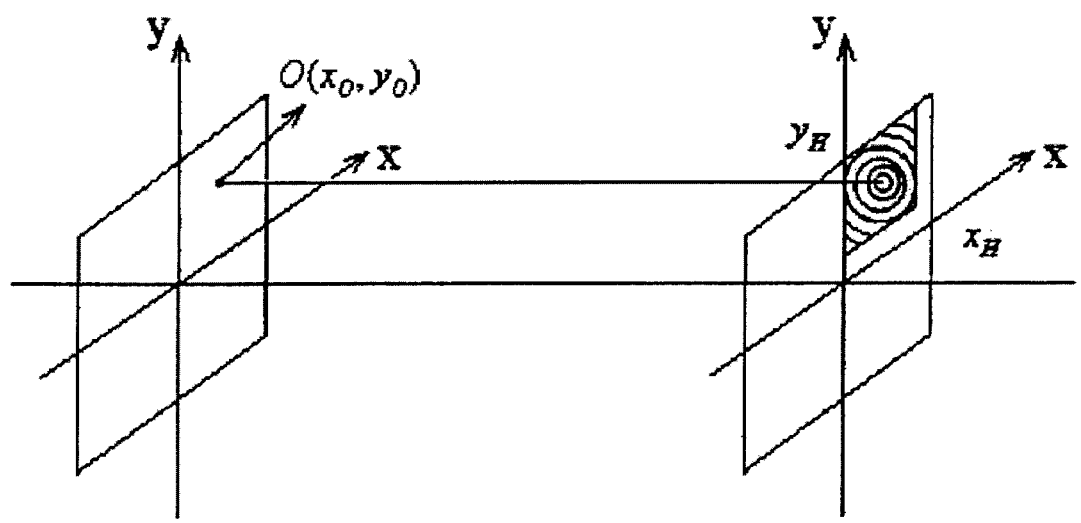
FIG. 4 is a schematic view showing a Fresnel zone corresponding to one point on an object.

As shown in FIG. 4, the holographic image of one point on the object just corresponds to a Fresnel zone. For all the object points in an identical plane at a given diffraction distance, in the case that a light beam in the form of a plane wave is adopted, an identical Fresnel zone may be acquired. Hence, the Fresnel zone corresponding to one point may be translated and superimposed on a holographic image so as to form the holographic image. FIG. 4 merely shows the Fresnel zone corresponding to one point.

Figure 5:
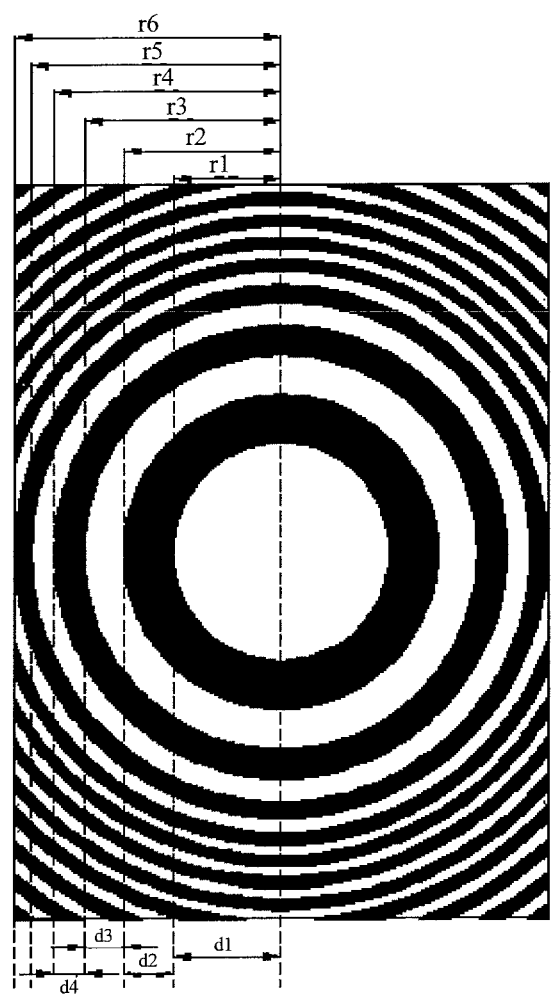
FIG. 5 is a schematic view showing the formation of the Fresnel zone.

Of course, the Fresnel zones corresponding to the object points at different diffraction distances are different from each other, and as shown in FIG. 5, a radius of each Fresnel zone may be calculated through the following equation (1) $r_j = \sqrt{jD\lambda}$, where j represents the number of the Fresnel zones, D represents the diffraction distance, and $\lambda$ represents a wavelength of the reference light beam. A width of each Fresnel zone may be calculated through the following equation (2) $d_j = r_j - r_{j-1}$.

Through the above equations, the distribution of the Fresnel zones is closely related to the diffraction distance D.

Table 1 shows the widths of parts of the Fresnel zones at different diffraction distances, where $\lambda$ is 0.55 μm.

TABLE 1

|  | d1 (μm) | d2 (μm) | d3 (μm) | d4 (μm) |
|---|---|---|---|---|
| D = 10 mm | 74.16 | 30.72 | 23.57 | 19.87 |
| D = 100 mm | 234.52 | 97.14 | 74.54 | 62.84 |
| D = 200 mm | 331.66 | 137.38 | 105.41 | 88.87 |
| D = 300 mm | 406.20 | 168.25 | 129.11 | 108.84 |

As shown in Table 1, the Fresnel zones are distributed sparsely at a center and distributed densely at a peripheral region, and the spatial frequency of the Fresnel zone at the center is low and the spatial frequency of the Fresnel zone at the peripheral region is high. The spatial frequency of each Fresnel zone $\xi$ may be calculated through the following equation (3)

$$\xi = \frac{1}{\Lambda},$$

where $\Lambda$ represents a spatial period of the Fresnel zone, i.e., a distance between two adjacent bright fringes.

Based on Nyquist sampling theorem, the liquid crystal cell may acquire the light transmittance distribution corresponding to the entire holographic fringe information merely in the case that $\xi_{max} \leq \xi_{LCD}/2$, where $$\xi_{LCD} = \frac{1}{\Delta x},$$

and $\Delta x$ represents a width of each subpixel of the liquid crystal cell. Based on Nyquist sampling theorem in conjunction with the equation (3), the following equation (4) may be acquired: $\Lambda_{min} \geq 2\Delta x$, where $\Lambda_{min} = d_j + d_{j-1}$. In the case of a given object distance D, a limitation on the number of the holographic fringes or the number of the Fresnel zones may be calculated through the equation (4).

For example, in the case $\Delta x = 50$ μm and D=300 mm, Table 2 shows the widths of the Fresnel zones.

TABLE 2

| d1 | d2 | d3 | d4 | d5 | d6 | d7 | d8 | d9 | d10 |
|---|---|---|---|---|---|---|---|---|---|
| 406.20 μm | 168.25 μm | 129.11 μm | 108.84 μm | 95.89 μm | 86.69 μm | 79.72 μm | 74.2 μm | 69.69 μm | 65.91 μm |
| d11 | d12 | d13 | d14 | d15 | d16 | d17 | d18 | d19 | d20 |
| 62.70 μm | 59.91 μm | 57.46 μm | 55.29 μm | 53.34 μm | 51.59 μm | 50.01 μm | 48.56 μm | 47.22 μm | 46.00 μm |

Based on Table 2 in conjunction with the equation (4), in the case that the subpixel of the liquid crystal cell has a width of 50 μm, the number of the Fresnel zones corresponding to an imaging point at an object distance of 300 mm is 17, and Table 2 shows the widths of the Fresnel zones.

In the above Fresnel zones, the odd-numbered Fresnel zones correspond to the bright fringes, and the even-numbered Fresnel zones correspond to the dark fringes. In the case that the liquid crystal cell, which is equivalent to the holographic plate, is irradiated with a light beam identical to the reference light beam, it is able to display the holographic image. The light transmittance of each optical unit of the liquid crystal cell may be adjusted dynamically, so it is able to display the holographic image dynamically.

The above analysis is made with respect to merely one object point. It should be appreciated that, one image consists of a plurality of object points. The same analysis may be made on respective holographic images corresponding to the other object points, and the Fresnel zones corresponding to all of the object points may be superimposed so as to acquire the holographic image. In addition, in order to enable the human eyes to view the holographic image in a consecutive manner, an interval between the sampled object points needs to be smaller than a limiting resolution of the human eyes. In this way, the object points of the reproduced image may be viewed by the human eyes consecutively rather than discretely.

Figure 6:
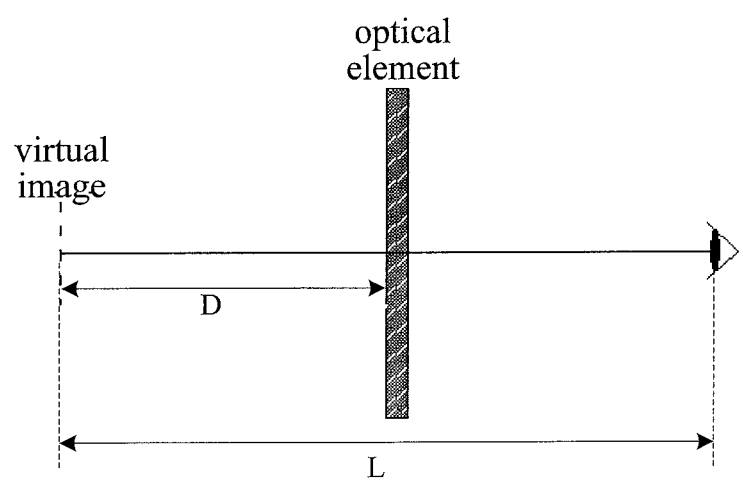
FIG. 6 is a schematic view showing a viewing distance between human eyes and an image plane.

A sampling rule of the adjacent object points will be described hereinafter illustratively. As shown in FIG. 6, in the case that a viewing distance between the human eyes and an image plane is L and a limiting resolution angle α of the human eyes is in a range of 1' to 2' (2' in a holographic reproductive condition), the limiting resolution c of the human eyes may be calculated through the following equation (5) ε=α*L. In the case that L=600 mm, ε=348 μm. In other words, in the case that the interval between two adjacent imaging points on the reproductive imaging plane is smaller than 348 μm, the two imaging points may be viewed by the human eyes consecutively rather than discretely. Hence, in the case of calculating the holographic image of the object, the interval between the sampling object points at the imaging distance of 600 mm may be 0.3 mm.

Figure 7:
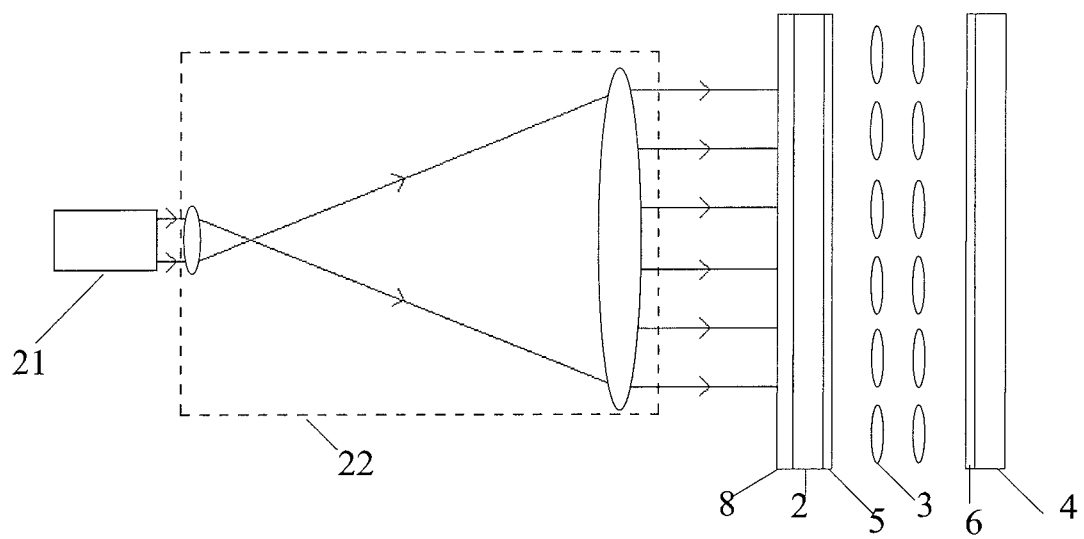
FIG. 7 is another schematic view showing the display device according to some embodiments of the present disclosure.

In another embodiment of the present disclosure, the refractive index of each optical unit may be adjusted so that the optical element is equivalent to the holographic plate. As shown in FIG. 7, the display device includes the laser source 21, the laser collimation and beam-expanding mechanism 22 and the optical element. The laser collimation and beam-expanding mechanism 22 is arranged between the laser source 21 and the optical element, and it is capable of expanding the diameter of the collimated light beam from the laser source 21. The laser source 21 is further configured to emit the reference light beam corresponding to the to-be-displayed holographic image, or the light beam in conjugation with the reference light beam corresponding to the to-be-displayed holographic image. In the case that the reference light beam corresponding to the to-be-displayed holographic image is generated by the laser source 21, it is able for the human eyes to view a reproduced virtual image of the holographic image at the light-entering side of the optical element. In the case that the light beam in conjugation with the reference light beam corresponding to the to-be-displayed holographic image is emitted by the laser source 21, it is able for the human eyes to view a reproduced real image of the holographic image on a viewing screen at the light-exiting side of the optical element.

As shown in FIG. 7, the optical element includes: the first substantially transparent substrate 2 and the second substantially transparent substrate 4 arranged opposite to each other; the liquid crystal cell 3 arranged between the first substantially transparent substrate 2 and the second substantially transparent substrate 4 and including the plurality of liquid crystal units arranged independent of each other; and the first electrode 5 and the second electrode 6, wherein the first electrode 5 and the second electrode 6 are arranged on different transparent substrates respectively, or both the first electrode 5 and the second electrode 6 are arranged on either one of the first substantially transparent substrate and the second substantially transparent substrate. The electric field is capable of being generated between the first electrode 5 and the second electrode 6 so as to drive the liquid crystal molecules in each liquid crystal unit to be deflected. To be specific, in this embodiment, as shown in FIG. 3, the first electrode 5 may be arranged on the first substantially transparent substrate 2, and the second electrode 6 may be arranged on the second substantially transparent substrate 4. Each liquid crystal unit, and the first electrode and the second electrode corresponding to the liquid crystal unit together form one optical unit.

Further, the optical units are configured to enable the to-be-displayed holographic image to include a plurality of fringes having different brightness values, and the optical element includes the optical units corresponding to the fringes respectively. The driving circuit is further configured to adjust the refractive index of the optical unit corresponding to each fringe in accordance with the brightness value of the fringe. At this time, the optical element is equivalent to a phase-mode diffractive grating including a plurality of optical units with different refractive indexes.

To be specific, for each object point, its holographic image includes first fringes and second fringes arranged alternately. A brightness of the first fringe is different from a brightness of the second fringe, and each first fringe has a brightness value greater than a brightness value of the second fringe. After the holographic images of a plurality of object points have been superimposed one on another, it is able to acquire the plurality of fringes having different brightness values. The optical unit corresponding to a position where the first fringes are superimposed has the largest light transmittance which may be set as 1. The optical unit corresponding to a position where the second fringes are superimposed has the smallest light transmittance which may be set as 0. Each optical unit corresponding to a position where the first fringe and the second fringe are superimposed one on another has an intermediate light transmittance within the range of 0 to 1. The number of the superimposed fringes may be normalized so as to acquire the light transmittance of the optical unit at the position where the first fringe and the second fringe are superimposed one on another.

In the case of adjusting the refractive index of the optical unit so as to enable the optical unit to be equivalent to the holographic plate, polarizers may also be attached to the light-entering side of the optical element. As shown in FIG. 7, the display device may further include a third polarizer 8 attached to the light-entering side of the optical element, and the initial alignment direction of the liquid crystal molecules in each liquid crystal unit is substantially parallel to a transmission axis of the third polarizer. It can therefore be seen that, at this time the polarizer at the light-exiting side of the optical element may be omitted.

Due to a birefringence property of the liquid crystals, the refractive index of the optical unit may be adjusted so that the optical element is equivalent to the holographic plate. In the case that a linearly-polarized light beam passes through the liquid crystal cell, different deflection states of the liquid crystals may correspond to different refractive indexes. In the case that a long-axis direction of each liquid crystal is substantially parallel to a polarization direction of the light beam, the refractive index of the light beam in the liquid crystal cell is $n_e$, and in the case that the long-axis direction of the liquid crystal is perpendicular to the polarization direction of the light beam, the refractive index of the light beam in the liquid crystal cell is $n_o$, where $n_e > n_o$. Based on this property, in the case that the light beam is transmitted in the liquid crystal cell, the phase distribution of the light beam may be equivalent to the phase distribution of a phase-mode diffractive grating acquired through calculation, and the modulation of the light beam by the liquid crystal cell is equivalent to the modulation of the light beam by a phase-mode holographic plate. At this time, a property of the liquid crystal cell is equivalent to a property of the holographic plate.

The phase distribution of the phase-mode diffractive grating may be calculated as follows.

Figure 8:
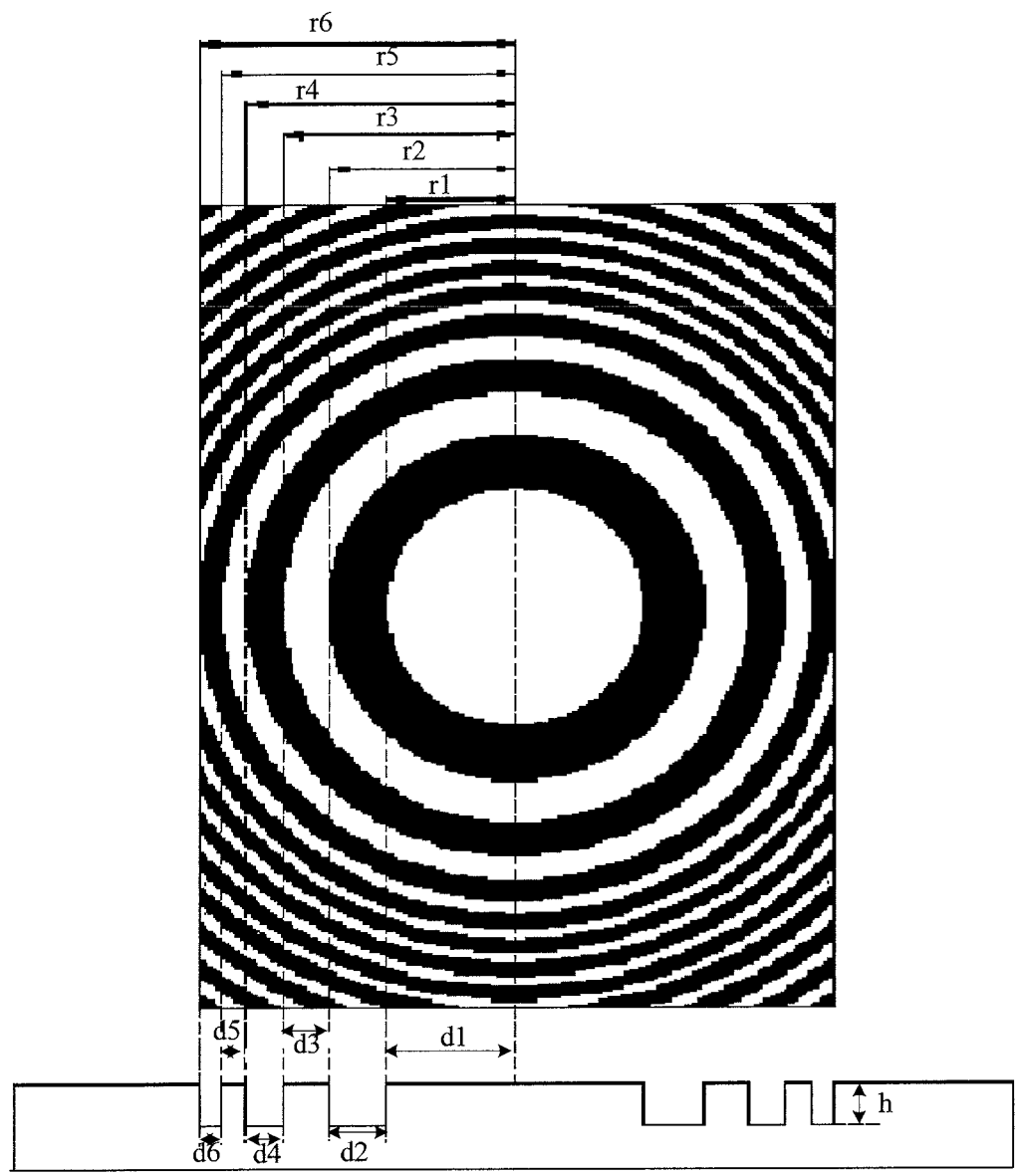
FIG. 8 is schematic view showing a physical calculation model of a phase-mode holographic plate.

As shown in FIG. 8, nontransparent portions at the positions where the dark fringes of the amplitude-mode diffractive grating in FIG. 5 may be changed to transparent portions, and the physical calculation model for the phase-mode holographic plate may be changed to a step-like structure in FIG. 8, where 7E represents a phase difference between two adjacent steps, and a height of each step may be calculated through the equation $$h = \frac{\lambda/2}{n-1}$$

(where $\lambda$ represents a wavelength, and n represents a refractive index of the holographic plate).

Figure 9:
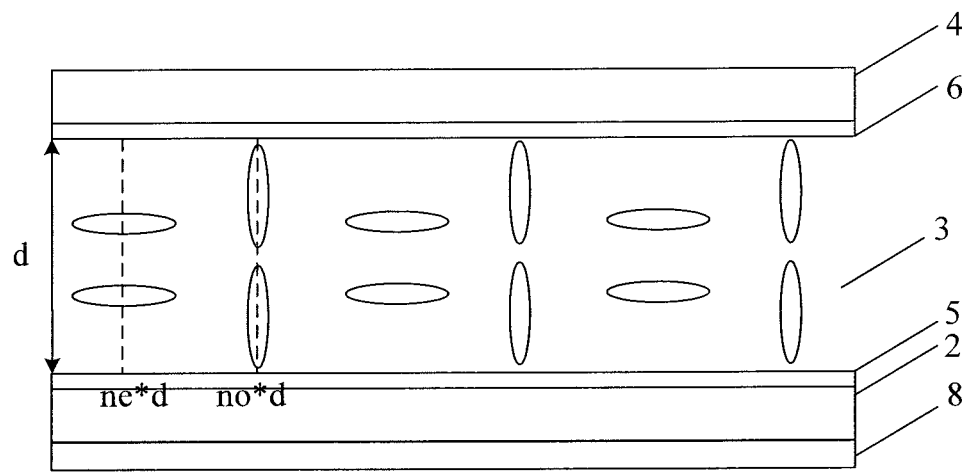
FIG. 9 is a schematic view showing a deflection state of liquid crystal molecules.

The liquid crystal molecules in the liquid crystal cell may be driven by controlling voltages applied to the first electrode 5 and the second electrode 6, so that the phase distribution of the light beam in the liquid crystal cell is equivalent to the phase distribution of the calculated phase-mode holographic plate. FIG. 9 shows the defection state of the liquid crystals. Due to an equivalence principle, an optical path difference of the light beam in the liquid crystal cell is equivalent to an optical path difference of the light beam in the phase-mode holographic plate acquired through calculation. Through comparing FIG. 8 with FIG. 9, it is able to acquire the following correspondence between the holographic plate and the liquid crystal: $nh-h=n_e d-n_o d$, where h represents the height of each step, $n_e$ and $n_o$ represent the refractive indexes of the polarized light beam at the corresponding positions of the liquid crystal cell in FIG. 9, and d represents the thickness of the liquid crystal cell.

It should be appreciated that, the diffraction efficiency of the phase-mode diffractive grating is higher than the diffraction efficiency of the amplitude-mode diffractive grating, so it is able to display the holographic image at a high light utilization rate in the case that the liquid crystal cell is equivalent to the holographic plate with the phase-mode diffractive grating. Through controlling the distribution of the refractive indexes of the linearly-polarized light beam in the liquid crystal cell, it is able to dynamically control the phase distribution of the incident polarized light beam in the liquid crystal cell. In the case that the optical element is irradiated with the reference light beam corresponding to the holographic plate corresponding to the to-be-displayed holographic image, it is able to dynamically display the holographic image at the high light utilization rate.

Figure 10:
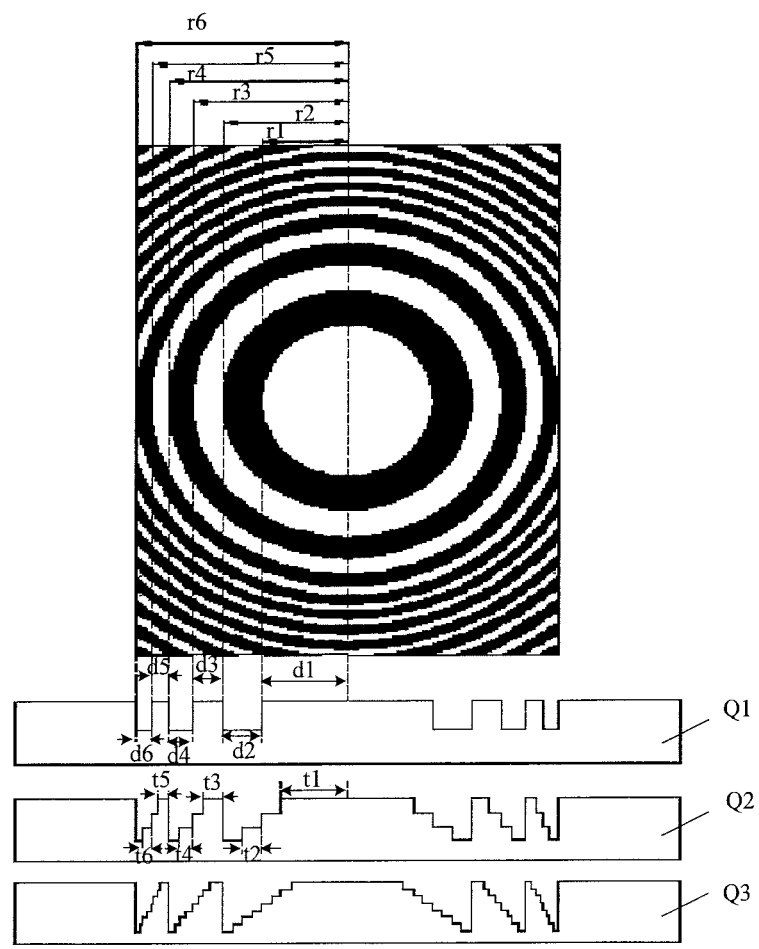
FIG. 10 is a schematic view showing another physical calculation model of the phase-mode holographic plate.

Further, the number of the steps in FIG. 8 may be increased, so as to improve the diffraction efficiency of the phase-mode diffractive grating. As shown in FIG. 10, the number of the steps is $N=2^m$ (where m=1, 2, 3, ... ), a phase difference between two adjacent steps is $2\pi/N$, and a height of each step is $$h = \frac{\lambda/N}{n-1}.$$

A width $t_j$ of each step of a multi-step phase-mode diffractive grating is related to whether the Fresnel zone is an odd-numbered or even-numbered one. To be specific, $$t_j = \begin{cases} \frac{d_j}{N/2}, (j \text{ is an odd number}) \\ d_j - \sum_{i=1}^{m-1} \frac{d_{j+1}}{2^i}, (j \text{ is an even number}) \end{cases},$$

where $d_j$ represents a width of each Fresnel zone. In the case that j is an odd number, there are N−1 steps each having the width $t_j$, and in the case that j is an even number, there is merely one step having the width $t_j$.

Through changing the deflection state of the liquid crystals, it is able to provide the light beam in the liquid crystal cell with various refractive indexes between $n_e$ and $n_o$, apart from $n_e$ and $n_o$. Based on this, in the case that the light beam is transmitted in the liquid crystal cell, the phase distribution of the light beam may be equivalent to the phase distribution of the multi-step phase-mode diffractive grating acquired through calculation, so the modulation of the light beam by the liquid crystal cell may be equivalent to the modulation of the light beam by a multi-step phase-mode holographic plate. Through changing the refractive index distribution of the linearly-polarized light beam in the liquid crystal cell, it is able to dynamically control the phase distribution of the incident linearly-polarized light beam in the liquid crystal cell. In the case that the optical element is irradiated with the reference light beam corresponding to the holographic plate corresponding to the to-be-displayed holographic image, it is able to dynamically display the holographic image at a high light utilization rate.

Further, in the case that the refractive index of the optical unit is adjusted so that the optical element is equivalent to the holographic plate, the driving circuit may include: a calculation unit configured to determine a holographic plate corresponding to the to-be-displayed holographic image in accordance with the image data, and adjust a refractive index of one optical unit (called as a first optical unit) or more optical units of the plurality of optical units in such a manner that the optical path difference of the incident linearly-polarized light beam in the liquid crystal cell is equivalent to the optical path difference of the incident linearly-polarized light beam in the holographic plate.

The holographic plate corresponding to the to-be-displayed holographic image includes M regions at each side of a center line in a widthwise direction, a $(2k)^{th}$ region is a grating groove corresponding to the first optical unit and having a depth of h, $nh-h=n_e d-n_o d$, N steps are arranged in each grating groove, $N=2^M$, a phase difference between two adjacent steps is $2\pi/N$, each step has a height of $\lambda/N*(n-1)$, where $\lambda$ represents a wavelength of a visible light beam, n represents a refractive index of the holographic plate, d represents a thickness of the liquid crystal cell, M is an integer greater than 1, m is an integer greater than or equal to 0, and k is an integer greater than 0 and small than or equal to M.

In the embodiments of the present disclosure, the non-polarized light beams are emitted by the laser source. Of course, the linearly-polarized light beams may also be emitted by the laser source, and a polarization direction of the linearly-polarized light beam is substantially parallel to the initial alignment direction of the liquid crystal molecules in the optical unit. At this time, it is unnecessary to provide the polarizer at the light-entering side of the optical element.

The present disclosure further provides in some embodiments a display method for use in the above-mentioned display device, which includes steps of: acquiring image data out a to-be-displayed holographic image; controlling a laser source to emit a laser beam corresponding to the to-be-displayed holographic image, and adjusting a light transmittance and/or a refractive index of each optical unit in accordance with the image data.

According to the display method in the embodiments of the present disclosure, in the case of displaying the holographic image, the laser source emits the laser beam corresponding to the to-be-displayed holographic image, and each optical unit is capable of modulating the incident linearly-polarized light beam and has the adjustable light transmittance and/or the adjustable refractive index. Through controlling the light transmittance and/or the refractive index of the optical unit, it is able for the optical path difference of the light beam of the laser in the optical element to be equivalent to the optical path difference of the light beam of the laser in the holographic plate, thereby to display the holographic image. In addition, the refractive index of the optical unit is capable of being adjusted dynamically, so it is able to display the holographic image dynamically in the case that the optical element is irradiated with a reference light beam.

Further, the step of adjusting the light transmittance and/or the refractive index of each optical unit in accordance with the image data includes: determining the light transmittance and/or the refractive index of each optical unit in accordance with the image data; and driving the liquid crystal molecules in the optical unit to be deflected in accordance with the determined light transmittance and/or refractive index.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display device, comprising:
   an optical element comprising a plurality of optical units arranged independent of each other, wherein one or more optical parameters of each of the optical units are adjustable, and the one or more optical parameters comprise at least one of light transmittance or refractive index;
   a laser source arranged at a side of the optical element, and configured to emit a laser beam related to a to-be-displayed holographic image; and
   a driving circuit configured to adjust the light transmittance and/or refractive index of each of the optical units in accordance with image data about the to-be-displayed holographic image in such a manner that the optical unit is configured to modulate the laser beam or a linearly-polarized light beam acquired by converting the laser beam,
   wherein each of the optical units is a liquid crystal unit comprising liquid crystal molecules configured of being deflected under the effect of an electric field,
   wherein the optical element comprises; a first substantially transparent substrate and a second substantially transparent substrate arranged opposite to each other; and liquid crystal cell arranged between the first substantially transparent substrate and the second substantially transparent substrate and comprising a plurality of liquid crystal units arranged independent of each other; and a first electrode and a second electrode, wherein the electric field is configured of being generated between the first electrode and the second electrode to drive the liquid crystal molecules in the liquid crystal unit to be deflected,
   wherein the optical units are configured to enable the to-be-displayed holographic image to comprise a plurality of fringes having different brightness values, and each of the fringes corresponds to respective at least one optical unit; and the driving circuit is further configured to adjust the refractive index of the respective optical unit corresponding to each of the fringes in accordance with the brightness value of the fringe,
   wherein the driving circuit comprises; a calculation unit configured to determine a holographic plate corresponding to the to-be-displayed holographic image in accordance with the image data, and adjust a refractive index of a first optical unit of the plurality of optical units in such a manner that an optical path difference of the linearly-polarized light beam in the liquid crystal cell is equivalent to an optical path difference of the linearly-polarized light beam in the holographic plate,
   wherein the holographic plate comprises M regions arranged at each of two sides of a center line of the holographic plate in a widthwise direction, a $(2k)^{th}$ region is a grating grove corresponding to the first optical unit and having a depth of h, $nh-h=n_ed-n_od$, N steps are arranged in each granting groove, $N=2^\wedge m$, a phase difference between two adjacent ones of the steps is $2\pi/N$, each of the steps has a height of $\lambda/N*(n-1)$, wherein $\lambda$ represents a wavelength of a visible light beam, n represents a refractive index of the holographic plate, d represents a thickness of the liquid crystal cell, M is an integer greater than 1, m is an integer greater than or equal to 0, and k is an integer greater than 0 and small than or equal to M.

2. The display device according to claim , wherein both the first electrode and the second electrode are arranged on one of the first substantially transparent substrate and the second substantially transparent substrate.

3. The display device according to claim , wherein the first electrode is arranged at a side of the first substantially transparent substrate that is closer to the liquid crystal cell than another side of the first substantially transparent substrate being opposite to the side of the first substantially transparent substrate, and the second electrode is arranged at a side of the second substantially transparent substrate that is closer to the liquid crystal cell than another side of the second substantially transparent substrate being opposite to the side of the second substantially transparent substrate.

4. The display device according to claim 1, wherein the optical units are configured to enable the to-be-displayed holographic image to comprise a plurality of fringes having different brightness values, and each of the fringes corresponds to respective at least one optical unit; and
   the driving circuit is further configured to adjust the light transmittance of the respective optical unit corresponding to each of the fringes in accordance with the brightness value of the fringe.

5. The display device according to claim 4, wherein the larger the brightness value of the fringe, the larger the light transmittance of the respective optical unit corresponding to the fringe.

6. The display device according to claim 1, further comprising:
- a first polarizer arranged at the side of the optical element, an initial alignment direction of the liquid crystal molecules in the liquid crystal unit being substantially parallel to a transmission axis of the first polarizer; and
- a second polarizer arranged at a side of the optical element, a transmission axis of the second polarizer being perpendicular to the transmission axis of the first polarizer.

7. The display device according to claim 6, wherein the first polarizer is arranged at a side of the first substantially transparent substrate that is further away from the liquid crystal cell than another side of the first substantially transparent substrate being opposite to the side of the first substantially transparent substrate, and the second polarizer is arranged at a side of the second substantially transparent substrate that is further away from the liquid crystal cell than another side of the second substantially transparent substrate being opposite to the side of the second substantially transparent substrate.

8. The display device according to claim 1, further comprising:
- a third polarizer arranged at the side of the optical element, wherein an initial alignment direction of the liquid crystal molecules in the liquid crystal unit is substantially parallel to a transmission axis of the third polarizer.

9. The display device according to claim 8, wherein the third polarizer is arranged at a side of the first substantially transparent substrate that is further away from the liquid crystal cell than another side of the first substantially transparent substrate being opposite to the side of the first substantially transparent substrate.

10. The display device according to claim 1, wherein the laser beam is a linearly-polarized light beam whose polarized direction is substantially parallel to an initial alignment direction of the liquid crystal molecules.

11. The display device according to claim 1, further comprising:
- a laser collimation and beam-expanding mechanism arranged between the laser source and the optical element, and configured to expand a diameter of a collimated light beam from the laser source.

12. The display device according to claim 1, wherein the laser source is further configured to emit a reference light beam corresponding to the to-be-displayed holographic image, or a light beam in conjugation with the reference light beam corresponding to the to-be-displayed holographic image.

13. The display device according to claim 1, further comprising:
- a storage unit connected to the driving circuit, and configured to store therein the image data.

14. A display method for use in a display device, wherein the display device comprises an optical element, a laser source arranged at a side of the optical element, and a driving circuit, the optical element comprises a plurality of optical units arranged independent of each other, and one or more optical parameters of each of the optical units are adjustable, and the one or more optical parameters comprise at least one of light transmittance or refractive index,
wherein the display method comprises:
emitting, by the laser source, a laser beam related to a to-be-displayed holographic image; and adjusting, by the driving circuit, the light transmittance and/or the refractive index of each of the optical units in accordance with image data about the to-be-displayed holographic image in such a manner that the optical unit is configured to modulate the laser beam or a linearly-polarized light beam acquired by converting the laser beam,
wherein each of the optical units is a liquid crystal unit comprising liquid crystal molecules configured of being deflected under the effect of an electric field,
wherein the optical element comprises: a first substantially transparent substrate and a second substantially transparent substrate arranged opposite to each other, a liquid crystal cell arranged between the first substantially transparent substrate and the second substantially transparent substrate and comprising a plurality of liquid crystal units arranged independent of each other; and a first electrode and a second electrode, wherein the electric field is configured of being generate between the first electrode and the second electrode to drive the liquid crystal molecules in the liquid crystal unit to be deflected,
wherein the optical units are configured to enable the to-be-displayed holographic image to comprise a plurality of fringes having different brightness values, and each of the fringes corresponds to respective at least one optical unit; and the driving circuit is further configured to adjust the refractive index of the respective optical unit corresponding to each of the fringes in accordance with the brightness value of the fringe,
wherein the driving circuit comprises; a calculation unit configured to determine a holographic plate corresponding to the to-be-displayed holographic image in accordance with the image data, and adjust a refractive index of a first optical unit of the plurality of optical units in such a manner that an optical path difference of the linearly-polarized light beam in the liquid crystal cell is equivalent to an optical path difference of the linearly-polarized light beam in the holographic plate,
wherein the holographic plate comprises M regions arranged at each of two sides of a center line of the holographic plate in a widthwise direction. a $(2k)^{th}$ region is a grating groove corresponding to the first optical unit and having a depth of h, $nh-h=n_e d-n_o d$, N steps are arranged in each grating groove, $N=2^m$, a phase difference between two adjacent ones of the steps is $2\pi/N$, each of the steps has a height of $\lambda/N^*(n-1)$, where $\lambda$ represents a wavelength of a visible light beam, n represents a refractive index of the holographic plate, d represents a thickness of the liquid crystal cell, M is an integer greater than 1, m is an integer greater than or equal to 0, and k is an integer greater than 0 and small than or equal to M.

* * * * *